(12) United States Patent
Tsai (10) Patent No.: US 12,459,590 B2
(45) Date of Patent: Nov. 4, 2025

(54) BICYCLE SEAT CAPABLE OF BEING ADJUSTABLY MOVED

(71) Applicant: FOMING BICYCLE PARTS CO., LTD., Changhua County (TW)

(72) Inventor: Shang-Tsang Tsai, Changhua County (TW)

(73) Assignee: FOMING BICYCLE PARTS CO., LTD., Changhua County (TW)

( * ) Notice: Subject to any disclaimer, the term of this patent is extended or adjusted under 35 U.S.C. 154(b) by 212 days.

(21) Appl. No.: 18/498,592

(22) Filed: Oct. 31, 2023

(65) Prior Publication Data

US 2025/0136214 A1    May 1, 2025

(51) Int. Cl.
*B62J 1/08*      (2006.01)
*B62J 1/18*      (2006.01)

(52) U.S. Cl.
CPC .. *B62J 1/08* (2013.01); *B62J 1/18* (2013.01)

(58) Field of Classification Search
CPC ..................................... B62J 1/08; B62J 1/18
See application file for complete search history.

(56) References Cited

U.S. PATENT DOCUMENTS

| | | | | |
|---|---|---|---|---|
| 6,752,453 B1 * | 6/2004 | Yapp | ............................ | B62J 1/08 297/215.14 |
| 7,628,451 B2 * | 12/2009 | Chuang | .................... | B62J 1/005 297/215.14 |
| 7,762,931 B2 * | 7/2010 | Fisher | ................. | A63B 22/0605 297/215.14 |
| 8,668,261 B2 * | 3/2014 | Schranz | .................. | B62K 19/36 297/215.14 |
| 8,899,676 B2 * | 12/2014 | Sajonia | ....................... | B62J 1/00 297/215.14 |
| 9,671,062 B2 * | 6/2017 | Speronati Laghi | .......................... | A63B 22/0046 |
| 10,106,217 B1 * | 10/2018 | Hsu | .............................. | B62J 1/10 |
| 2022/0041235 A1 * | 2/2022 | Tsai | ....................... | F16C 11/103 |
| 2023/0182840 A1 * | 6/2023 | Morelli | ....................... | B62J 1/02 297/215.14 |

* cited by examiner

*Primary Examiner* — Philip F Gabler
(74) *Attorney, Agent, or Firm* — Demian K. Jackson; Jackson IPG PLLC (57) ABSTRACT

A bicycle seat contains a body, a support holder, two screwing blocks, and two slidable bolts. The body includes two through holes, two notches, and a groove. The support holder is fixed on a top of a seat post of a bicycle and is slidably fitted in the groove. The support holder includes two elongated orifices defined on a central section thereof. The two screwing blocks are fitted in the two notches of the top of the body to fix the two screwing blocks, and the two screwing blocks include two threaded orifices. The two slidable bolts extend through the two elongated orifices and the two through holes to screw with the two threaded orifices, such that the two slidable bolts engage the body and the support holder, and the two slidable bolts are rotated loosely to adjust the body to move forward and backward.

9 Claims, 10 Drawing Sheets

FIG. 10
PRIOR ART

BICYCLE SEAT CAPABLE OF BEING ADJUSTABLY MOVED

TECHNICAL FIELD

The present invention relates to a bicycle seat, and more particularly to the bicycle seat which is capable of being adjustably moved.

BACKGROUND

Bicycles are one of the most popular transportation tools for modern people. They are convenient, energy-free, pollution-free, and have the functions of sports and leisure. In recent years, as the leisure trend has become more and more popular and people pay more attention to the quality of leisure life, bicycles have gradually become more and more popular. It is loved and widely used by modern people.

A conventional bicycle seat structure contains a body, a seat rail mounted on a bottom of the body and made of metal, a clamp connected on a top of a seat post so that the clamp clamps the seat rail, and the body is connected with the seat post, wherein the body is adjustably moved frontward and backward to a desired position based on using requirements. However, such a bicycle seat structure contains the seat rail mounted on the bottom of the body to increase the weight of the bicycle seat structure, working process and equipment, and labor cost. Also, the seat rail will influence the aesthetic appearance of the bicycle.

Figure 9:
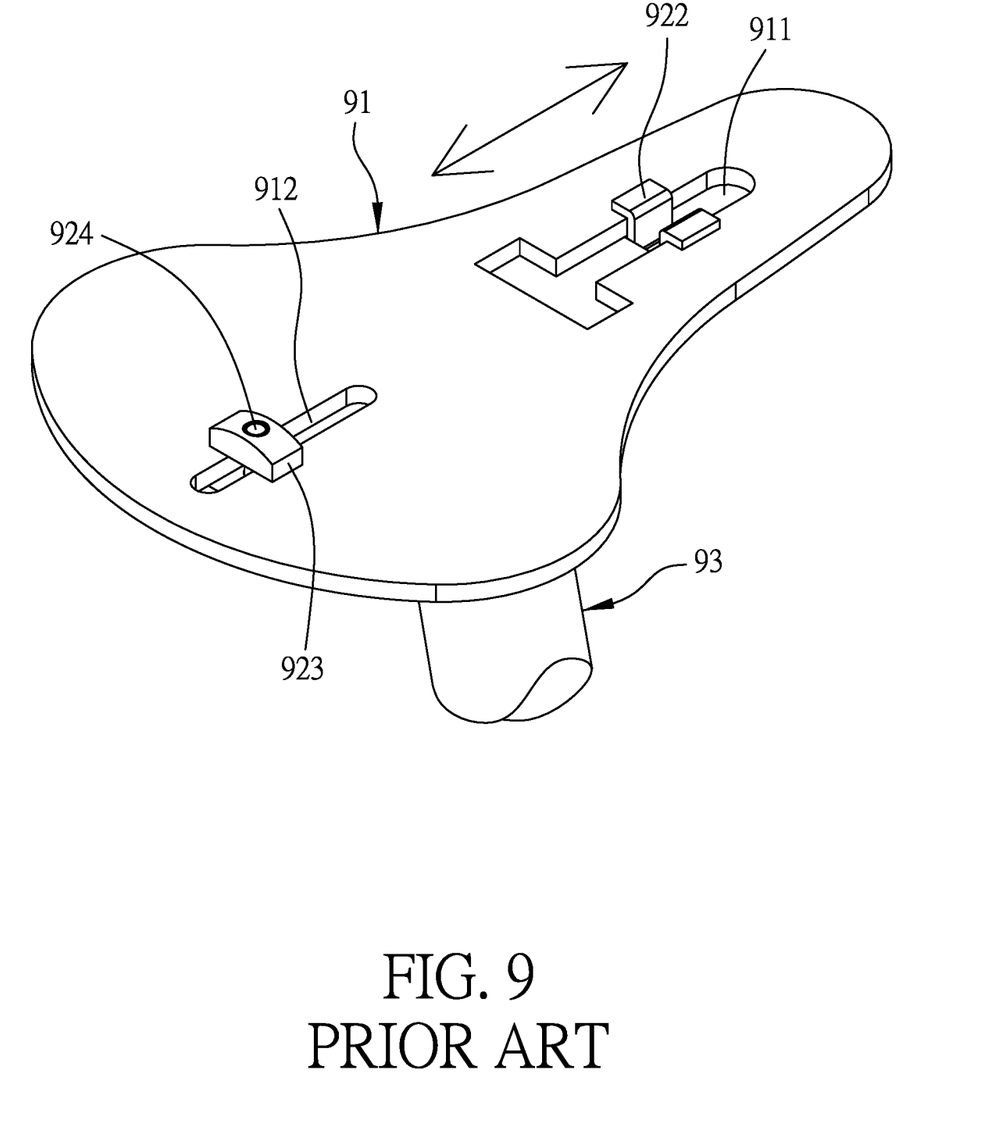
FIG. 9 is a perspective view of a conventional bicycle seat.
Figure 10:
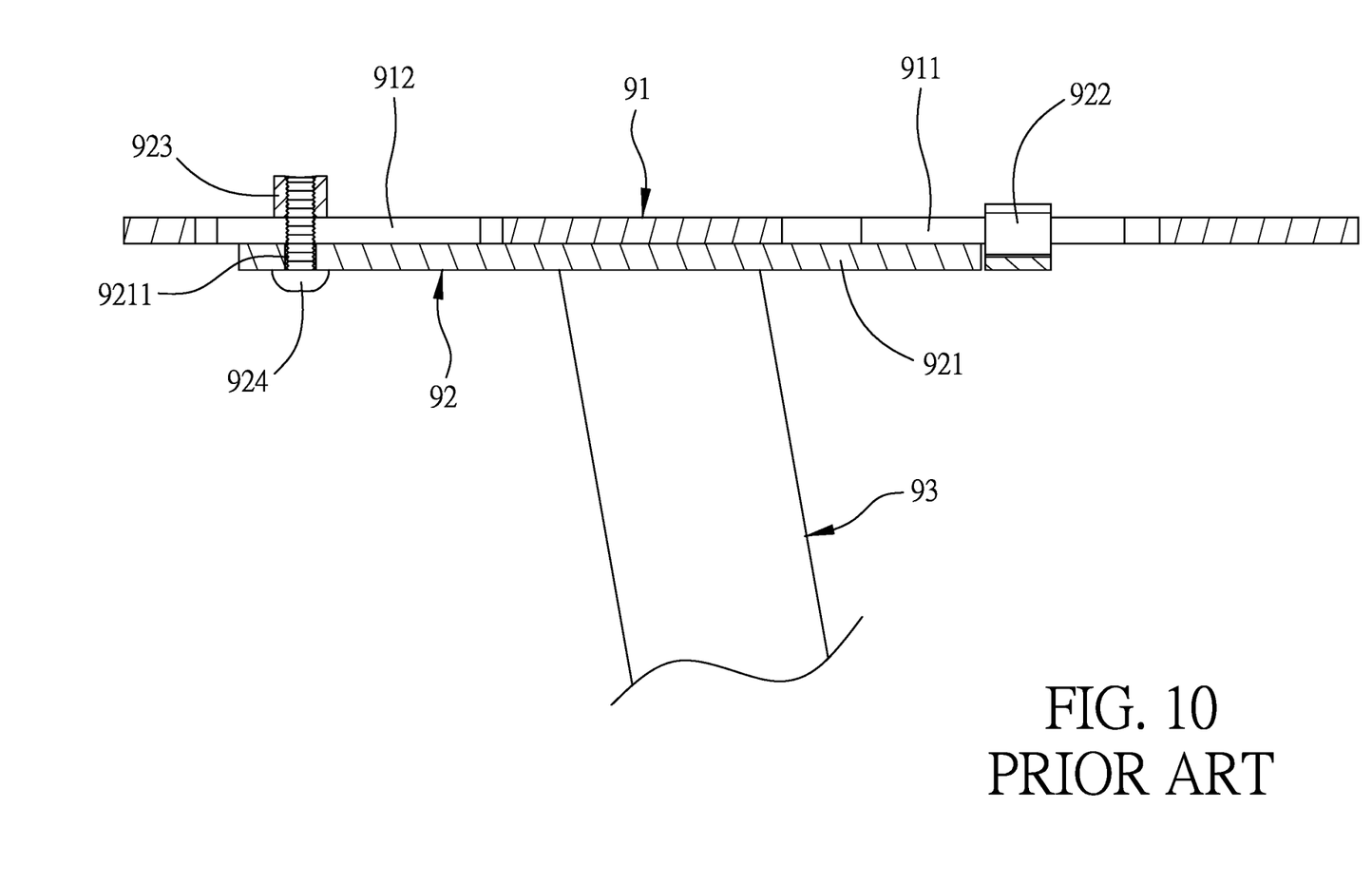
FIG. 10 is a cross sectional view of the conventional bicycle seat.

To improve the above-mentioned problem, as shown in FIGS. 9 and 10, a conventional bicycle seat structure contains a body 91 and a support assembly 92. The body 91 includes a Tee slot 911 and an elongated groove 912 which are located on a straight line of the body 91. The support assembly 92 includes a holder 921, a T-shaped element 922, a clamper 923, and a threaded bolt 924. The holder 921 is mounted on a top of a seat post 93 of the bicycle, an and of the holder 921 has a through orifice 9211 defined thereon, and the other end of the holder 93 has the T-shaped element 922 fixed thereon and passing through the Tee groove 911 upward, wherein the clamp 923 is disposed on a top of the body 91 and corresponding to the elongated slot 912, and the threaded bolt 924 is screwed with the clamp 923 after upward inserting through the through orifice 9211 of the holder 921 and the elongated groove 912 of the body 91, thus fixing the body 91, rotating the threaded bolt 924 loosely, and adjusting the body 91 frontward and backward.

However, the T-shaped element 922 of the conventional bicycle seat structure has to be connected with the holder 921 and inserted through the Tee groove 911 of the body 91, thus causing troublesome assembly and poor production quantity and riding stability. For example, when a stress of the bicycle seat accumulates on the threaded bolt 924 and the clamp 923 during riding the bicycle, a removal or damage will occur, and the bicycle seat will swing leftward or rightward to have unstable and unsafe riding.

The present invention has arisen to mitigate and/or obviate the afore-described disadvantages.

SUMMARY

The primary aspect of the present invention is to provide a bicycle seat which connects the body and the support holder by slidably fitting the body with the support holder, and the two slidable bolts are screwed with the two screwing blocks, thus connecting the body with the support holder easily to have mass production of the bicycle seat.

Another aspect of the present invention is to provide a bicycle seat which connects the body with the support holder securely, because the two slidable bolts are screwed with the two screwing blocks without removal or damage when riding the bicycle, and the body does not swing leftward or rightward, when a rider shifts a gravity center, thus obtaining a riding safety.

To obtain the above-mentioned aspects, a bicycle seat provided by the present invention contains a body, a support holder, two screwing blocks, and two slidable bolts.

The body includes two through holes formed on a central section thereof, two notches defined on a top of the body around the two through holes, and a groove defined on a central section of a bottom of the body and communicating with the two through holes. A front end of the groove is covered.

The support holder is fixed on a top of a seat post of a bicycle so as to support the body, and the support holder is slidably fitted in the groove. The support holder includes two elongated orifices defined on a central section thereof.

The two screwing blocks are fitted in the two notches of the top of the body so as to fix the two screwing blocks, and the two screwing blocks include two threaded orifices defined on two centers thereof.

The two slidable bolts extend through the two elongated orifices of the support holder and the two through holes of the body to screw with the two threaded orifices of the two screwing blocks, such that the two slidable bolts engage the body and the support holder, and the two slidable bolts are rotated loosely to adjust the body to move forward and backward.

DETAILED DESCRIPTION

With reference to FIGS. 1-6, a bicycle seat capable of being adjustably moved according to a preferred embodiment of the present invention comprises a body 10, a support holder 20, two screwing blocks 30, two slidable bolts 40, a cap 50, and a bottom sheet 60.

The body 10 includes two through holes 11 formed on a central section thereof, two notches 12 defined on a top of the body 10 around the two through holes 11, and a groove 13 defined on a central section of a bottom of the body 10 and communicating with the two through holes 11, wherein a front end of the groove 13 is covered, and the groove 13 has a defining protrusion 14 formed proximate to a rear end thereof.

The support holder 20 is fixed on a top of a seat post 70 of a bicycle so as to support the body 10, and the support holder 20 is slidably fitted in the groove 13, wherein the support holder 20 includes two elongated orifices 21 defined on a central section thereof and corresponding to the two through holes 11, and a limiting recess 22 defined on a top of the support holder 20 and corresponding to the defining protrusion 14, wherein the defining protrusion 14 is slidably fitted in the limiting recess 22. In this embodiment, the support holder 20 is inserted on a top of the seat post 70 of the bicycle.

The two screwing blocks 30 are fitted in the two notches 12 of the top of the body 10, and the two screwing blocks 30 include two circular columns 31 extending downward from two bottoms thereof and fitted in the two through holes 11 of the body 10 so as to fix the two screwing blocks 30 securely, wherein the two screwing blocks 30 include two threaded orifices 32 defined on two centers thereof, passing through the two circular columns 31, and corresponding to the two elongated orifices 21 of the support holder 20.

The two slidable bolts 40 extend through the two elongated orifices 21 of the support holder 20 and the two through holes 11 of the body 10 to screw with the two threaded orifices 32 of the two screwing blocks 30, such that the two slidable bolts 40 mate with the two screwing blocks 30 to engage the body 10 and the support holder 20, thus connecting the body 10 with the support holder 20.

The cap 50 is made of any one of leather, artificial leather, cloth and other synthetic materials and is configured to cover the body 10.

The bottom sheet 60 is covered on the bottom of the body 10 and is connected with the body 10 by using at least one screw, wherein the bottom sheet 60 includes a hollow portion 61 corresponding to the groove 13 of the body 10.

Figure 1:
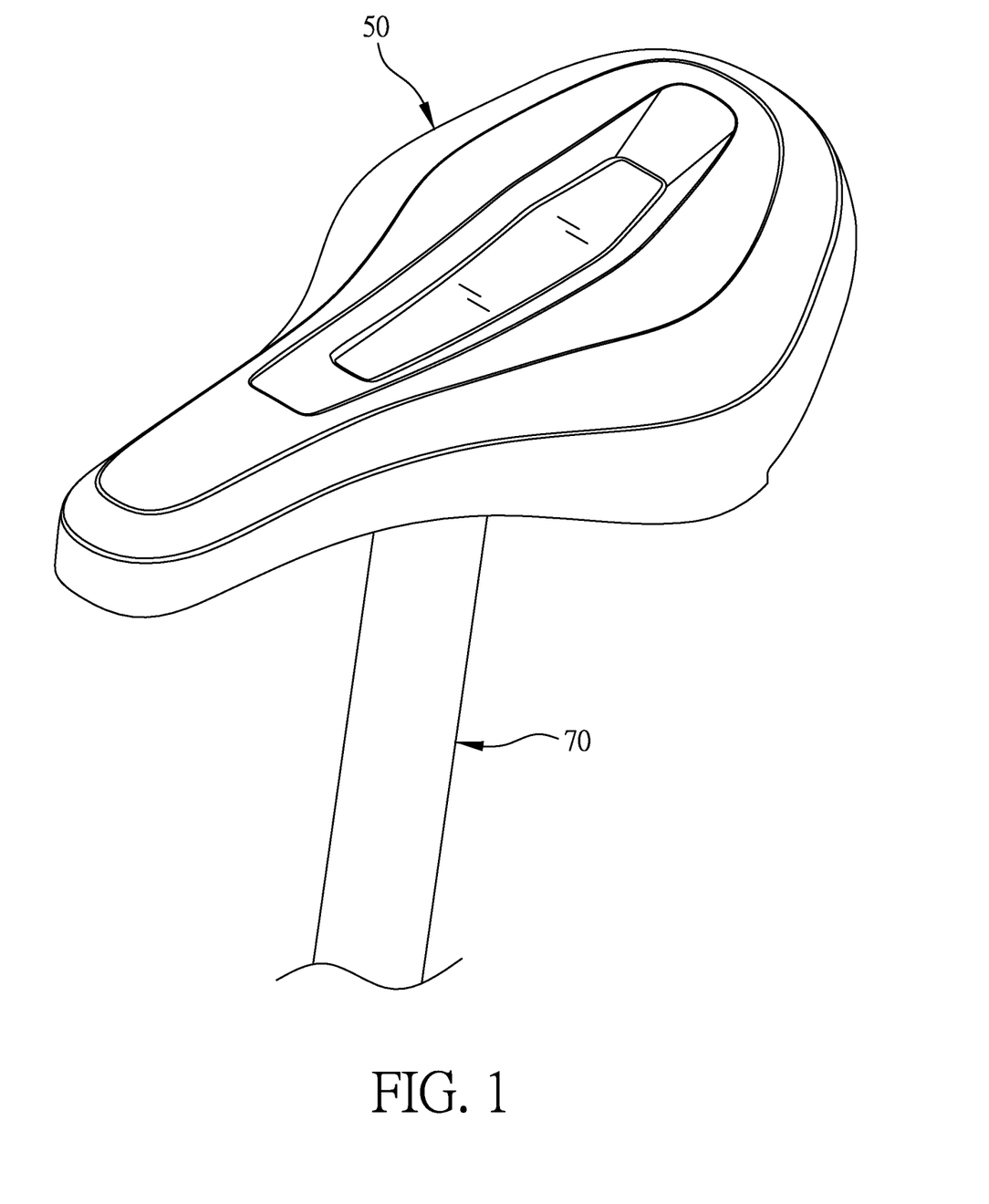
FIG. 1 is a perspective view showing the assembly of a bicycle seat according to a preferred embodiment of the present invention.
Figure 2:
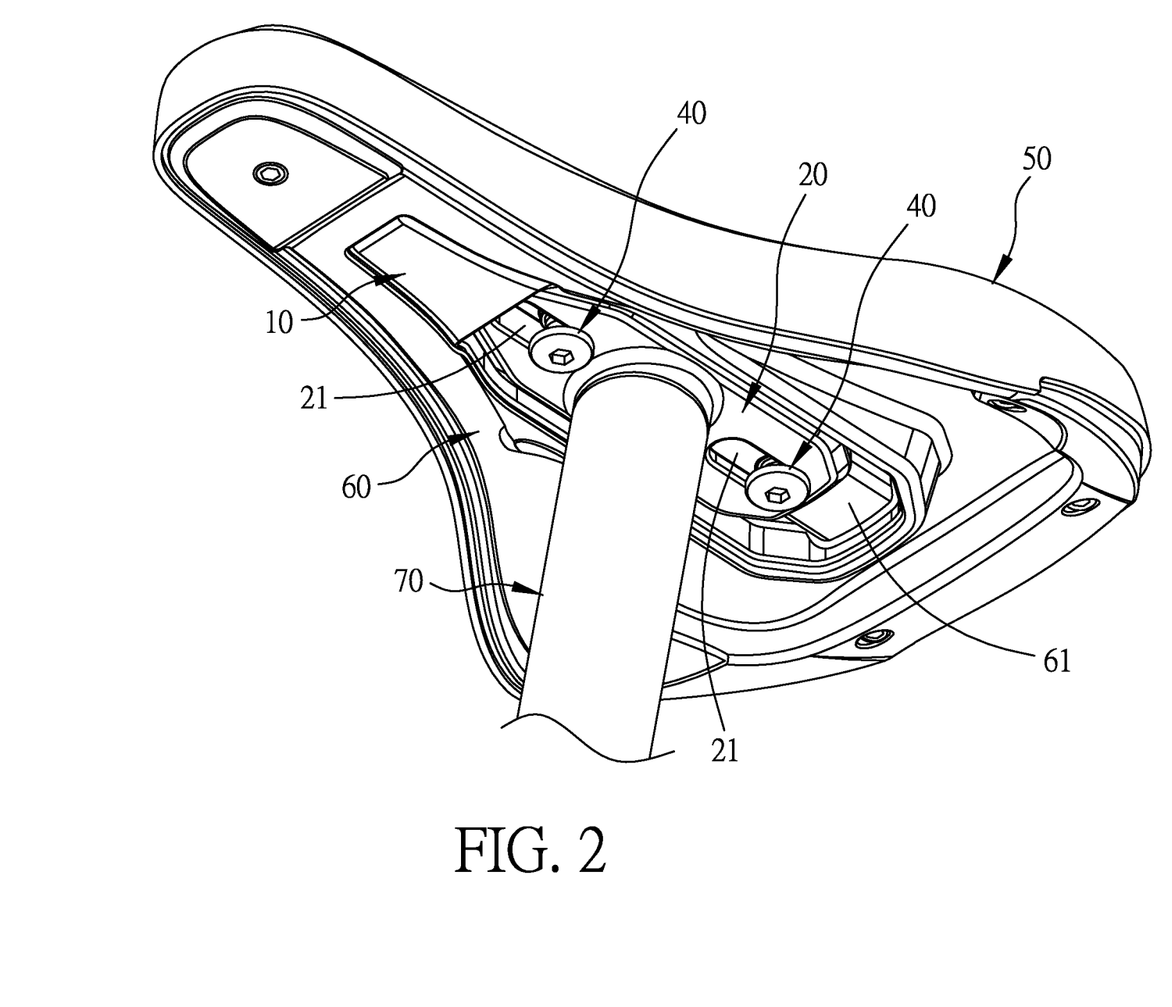
FIG. 2 is another perspective view showing the assembly of the bicycle seat according to the preferred embodiment of the present invention.
Figure 3:
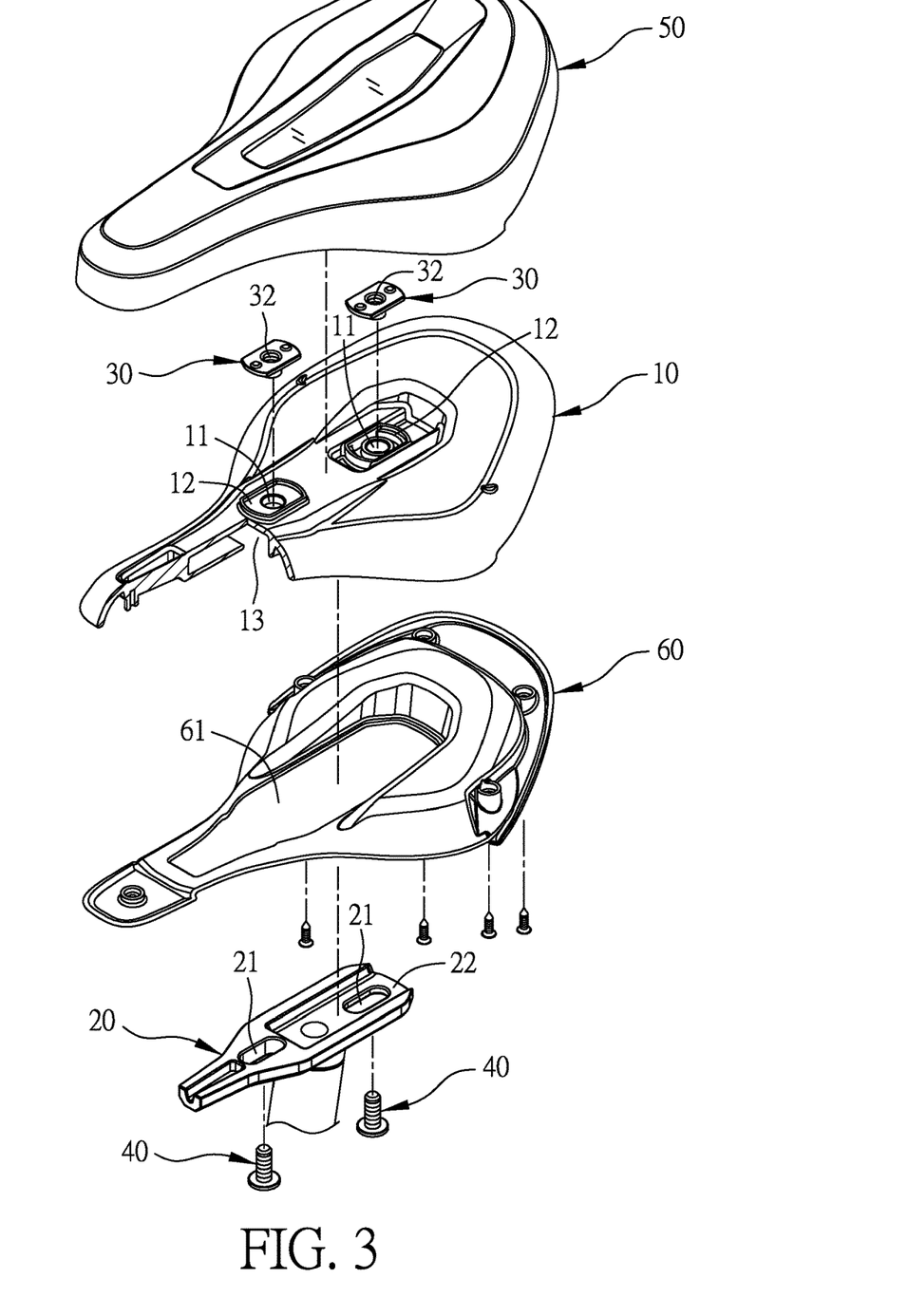
FIG. 3 is a perspective view showing the exploded components of the bicycle seat according to the preferred embodiment of the present invention.
Figure 4:
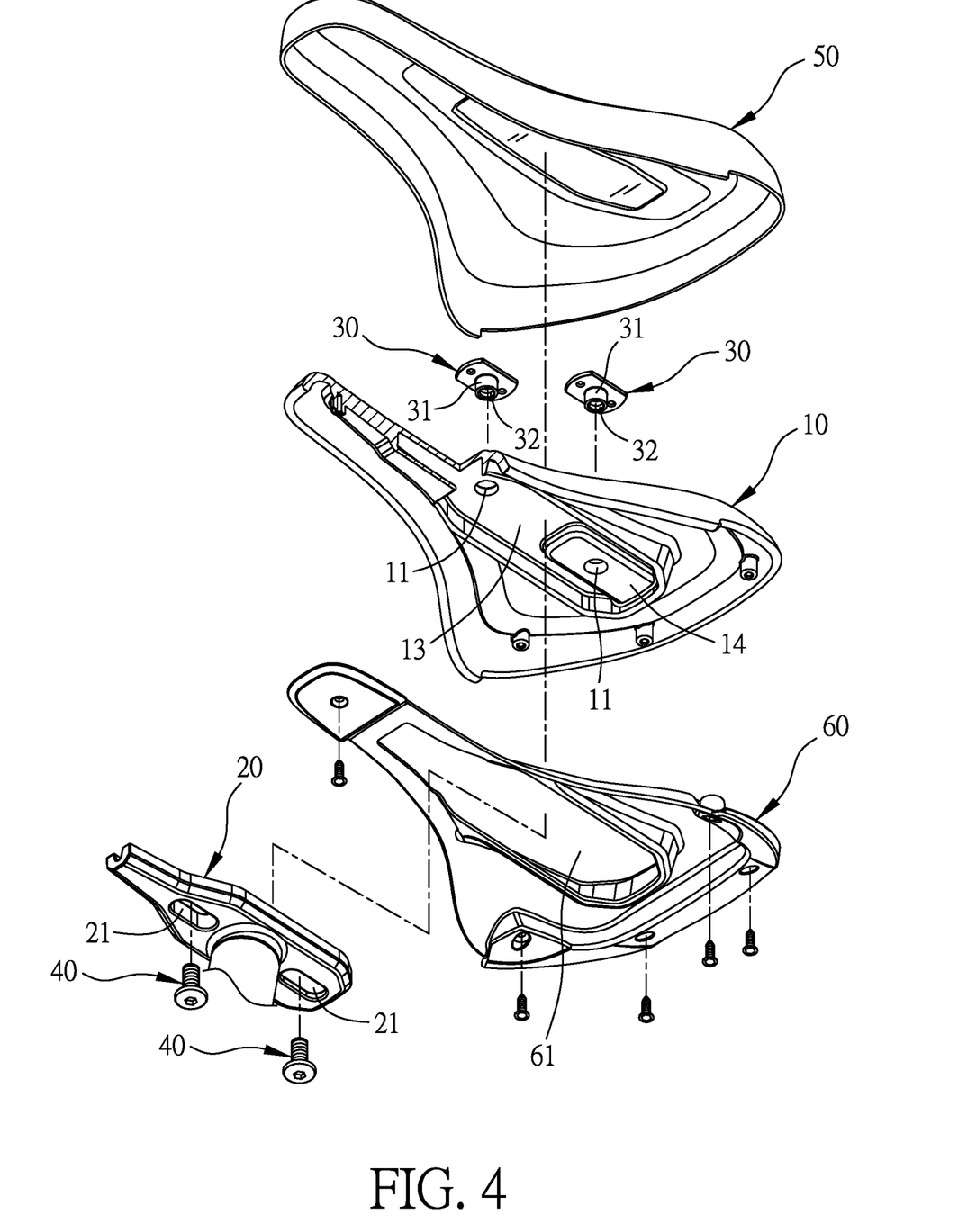
FIG. 4 is another perspective view showing the exploded components of the bicycle seat according to the preferred embodiment of the present invention.
Figure 5:
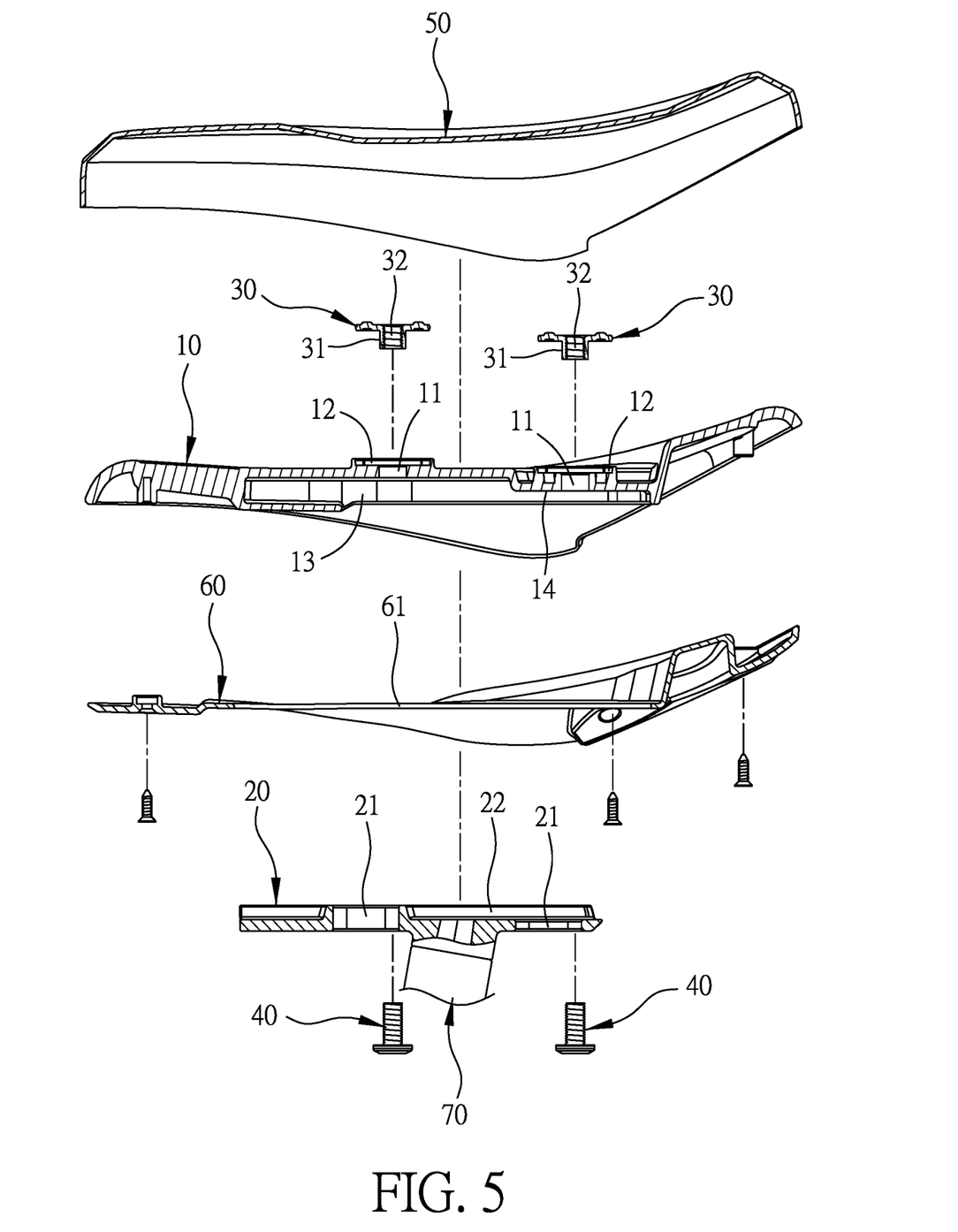
FIG. 5 is a cross sectional view showing the exploded components of the bicycle seat according to the preferred embodiment of the present invention.
Figure 6:
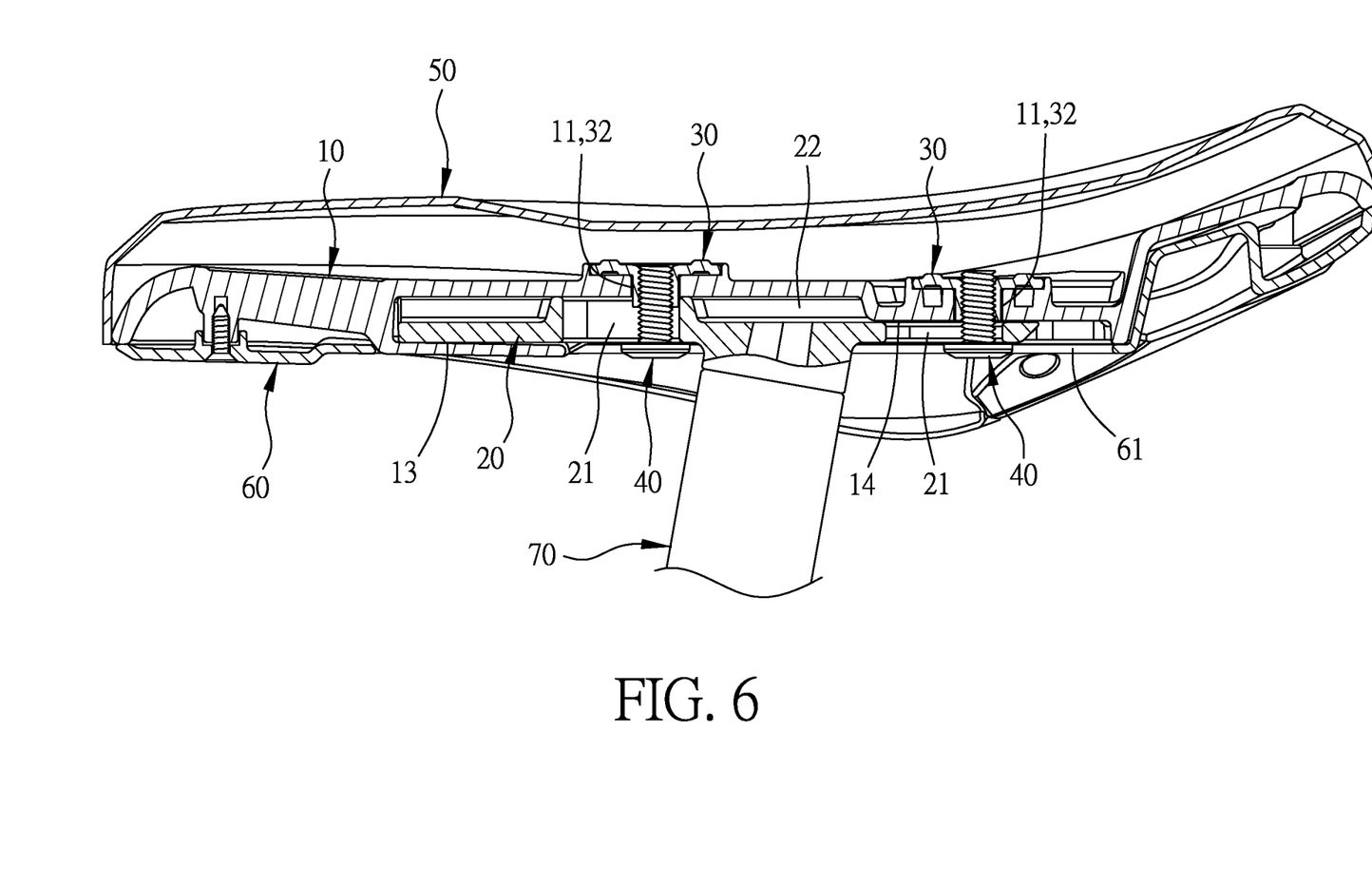
FIG. 6 is a cross sectional view showing the assembly of the bicycle seat according to the preferred embodiment of the present invention.
Figure 7:
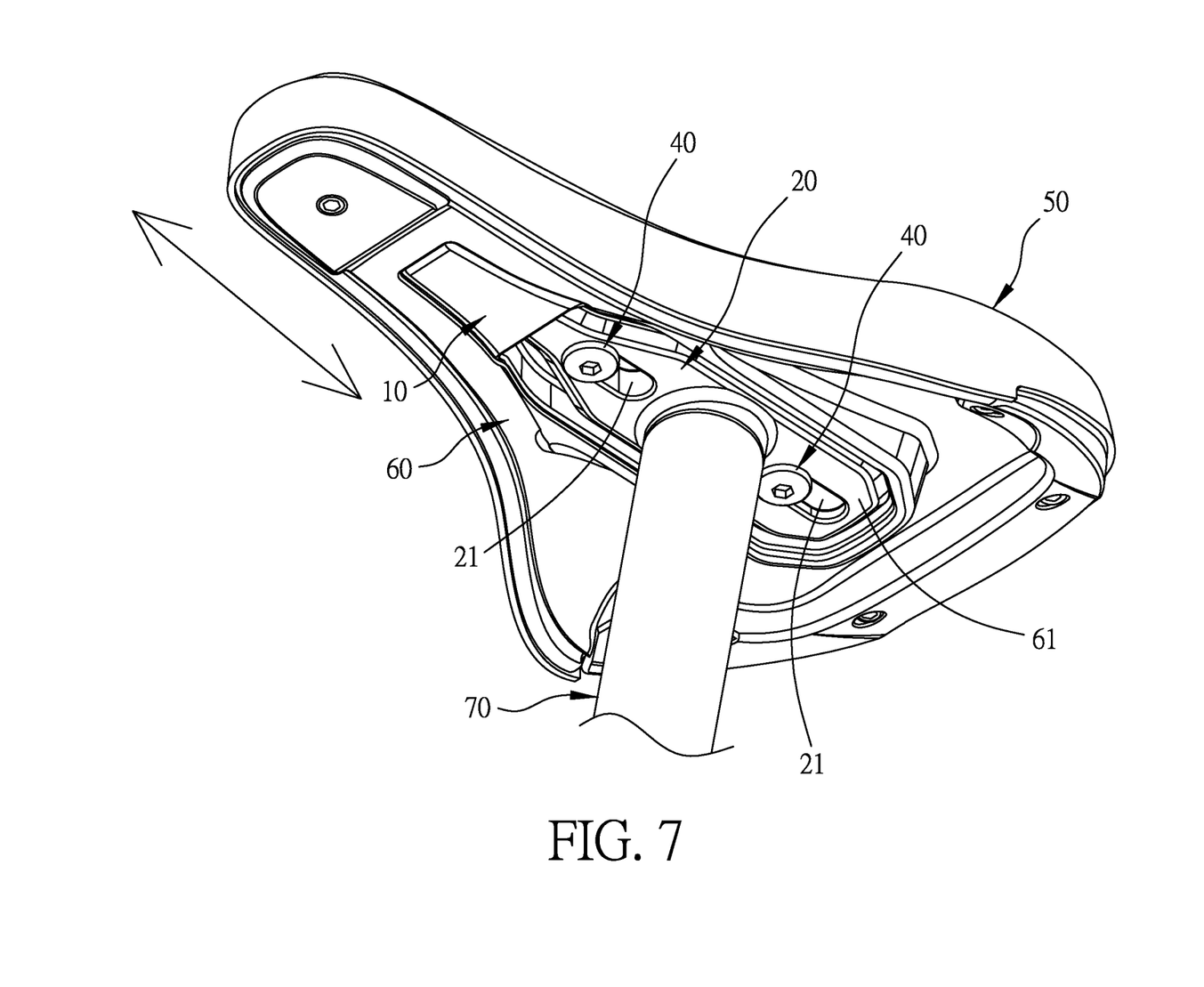
FIG. 7 is a perspective view showing the operation of the bicycle seat according to the preferred embodiment of the present invention.
Figure 8:
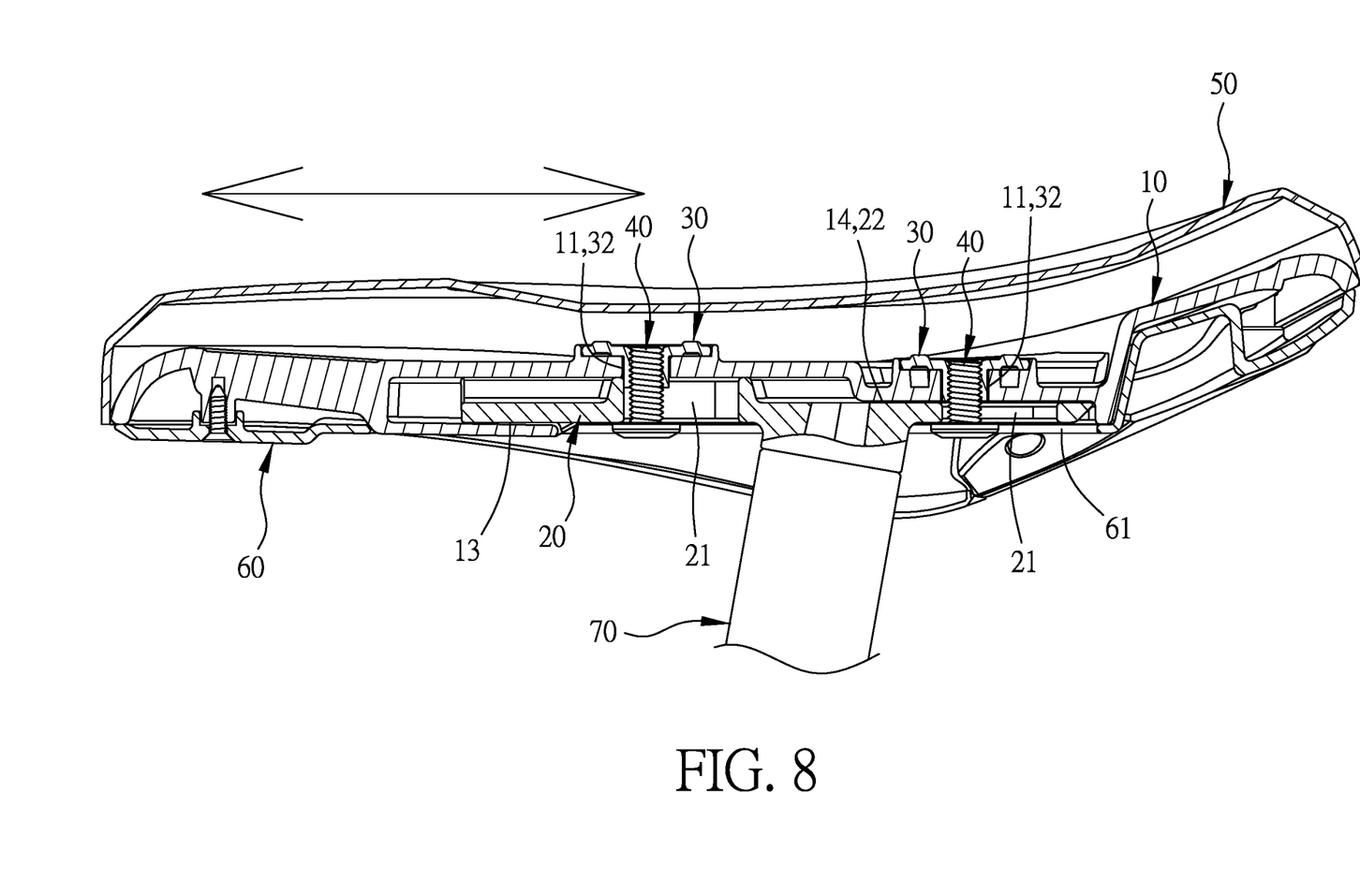
FIG. 8 is a cross sectional view showing the operation of the bicycle seat according to the preferred embodiment of the present invention.

Referring to FIGS. 7 and 8, as desiring to adjustably move the body 10 to a desired position, the two slidable bolts 40 are rotated loosely to remove the body 10 from the support holder 20, wherein the two slidable bolts 40 slide in the two elongated orifices 21 of the support holder 20, the groove 13 of the body 10 slides with respect to the support holder 20, the defining protrusion 14 of the body 10 slides relative to the limiting recess 22 of the support holder 20 so as to adjustably move the body 10 forward or backward. After the body 10 is adjustably moved to the desired position, the two slidable bolts 40 are rotated tightly to mate with the two screwing blocks 30 to engage the body 10 and the support holder 20, thus connecting the body 10 with the support holder 20 securely to adjust the bicycle seat easily.

Accordingly, the bicycle seat of the present invention has advantages as follows:

1) The body 10 and the support holder 20 of the bicycle seat are connected by slidably fitting the body 10 with the support holder 20, and the two slidable bolts 40 are screwed with the two screwing blocks 30, thus connecting the body 10 with the support holder 20 easily to have mass production of the bicycle seat.

2) The body 10 is connected with the support holder 20 securely, because the two slidable bolts 40 are screwed with the two screwing blocks 30 without removal or damage when riding the bicycle, and the body 10 does not swing leftward or rightward, when a rider shifts a gravity center, thus obtaining a riding safety.

While the first embodiments of the invention have been set forth for the purpose of disclosure, modifications of the disclosed embodiments of the invention as well as other embodiments thereof may occur to those skilled in the art. The scope of the claims should not be limited by the first embodiments set forth in the examples, but should be given the broadest interpretation consistent with the description as a whole.

What is claimed is:

1. A bicycle seat comprising:
a body including two through holes formed on a central section of the body, two notches defined on a top of the body around the two through holes, and a groove defined on a central section of a bottom of the body and communicating with the two through holes, wherein a front end of the groove is covered;
a support holder fixed on a top of a seat post of a bicycle so as to support the body, and the support holder being slidably fitted in the groove, wherein the support holder includes two elongated orifices defined on a central section thereof;
two screwing blocks fitted in the two notches of the top of the body so as to fix the two screwing blocks, wherein the two screwing blocks include two threaded orifices defined on two centers thereof; and
two slidable bolts extending through the two elongated orifices of the support holder and the two through holes of the body to screw with the two threaded orifices of the two screwing blocks, such that the two slidable bolts engage the body and the support holder, and the two slidable bolts can be loosened by rotation to adjust the body to move forward and backward.

2. The bicycle seat as claimed in claim 1, wherein the groove has a defining protrusion formed proximate to a rear end thereof, and the support holder includes a limiting recess defined on a top thereof and corresponding to the defining protrusion, wherein the defining protrusion is slidably fitted in the limiting recess.

3. The bicycle seat as claimed in claim 1, wherein the support holder is inserted on a top of the seat post of the bicycle.

4. The bicycle seat as claimed in claim 1, wherein the two screwing blocks include two circular columns extending downward from two bottoms thereof and fitted in the two through holes of the body.

5. The bicycle seat as claimed in claim 4, wherein the two threaded orifices of the two screwing blocks pass through the two circular columns.

6. The bicycle seat as claimed in claim 1, wherein the two threaded orifices of the two screwing blocks correspond to the two elongated orifices of the support holder.

7. The bicycle seat as claimed in claim 1 further comprises a cap configured to cover the body.

8. The bicycle seat as claimed in claim 1 further comprises a bottom sheet covered on the bottom of the body, wherein the bottom sheet includes a hollow portion corresponding to the groove of the body.

9. The bicycle seat as claimed in claim 8, wherein the bottom sheet is connected with the body by using at least on screw.

\* \* \* \* \*